(12) United States Patent
Kiessner-Haiden

(10) Patent No.: US 8,315,761 B2
(45) Date of Patent: Nov. 20, 2012

(54) METHOD FOR THE CONTROL OF AN ASSEMBLY

(75) Inventor: Martin Kiessner-Haiden, Lebring (AT)

(73) Assignee: MAGNA Powertrain AG & Co KG, Lannach (AT)

(*) Notice: Subject to any disclaimer, the term of this patent is extended or adjusted under 35 U.S.C. 154(b) by 1001 days.

(21) Appl. No.: 12/317,698

(22) Filed: Dec. 23, 2008

(65) Prior Publication Data

US 2009/0164077 A1 Jun. 25, 2009

(30) Foreign Application Priority Data

Dec. 24, 2007 (DE) .......... 10 2007 062 675

(51) Int. Cl.
*G06F 13/00* (2006.01)
(52) U.S. Cl. .......... 701/32.7; 701/29.1; 701/36
(58) Field of Classification Search .......... 701/39.1, 701/39.6, 32.2, 32.7, 33.4, 34.2, 34.3, 34.4, 701/35, 36, 51, 55, 56, 58, 59, 62, 67, 68, 701/29.1, 29.6; 711/162; 707/640–660, 707/679, 680
See application file for complete search history.

(56) References Cited

U.S. PATENT DOCUMENTS

| | | | |
|---|---|---|---|
| 6,859,718 B2 * | 2/2005 | Fritz et al. | 701/100 |
| 2003/0154956 A1 * | 8/2003 | Eckerle et al. | 123/357 |
| 2006/0119370 A1 * | 6/2006 | Schroeder | 324/691 |

FOREIGN PATENT DOCUMENTS

| | | |
|---|---|---|
| DE | 102 18 606 A1 | 11/2003 |
| DE | 102 54 855 A1 | 6/2004 |
| DE | 103 33 651 A1 | 2/2005 |
| DE | 10 2005 001 427 | 7/2006 |
| DE | 10 2005 021 917 | 11/2006 |
| DE | 102005021917 A1 * | 11/2006 |
| DE | 10 2005 049 483 | 4/2007 |
| WO | 2005/119041 A1 | 12/2005 |
| WO | 2006/074849 A1 | 7/2006 |

* cited by examiner

*Primary Examiner* — Khoi Tran
*Assistant Examiner* — Spencer Patton
(74) *Attorney, Agent, or Firm* — Harness, Dickey & Pierce, P.L.C.

(57) ABSTRACT

A method for the control of an assembly by a control unit, in particular in a motor vehicle, wherein the assembly includes at least one component, at least one actuator associated with the component, and an additional control unit having a first non-volatile memory section that is connected to the control unit. The control unit includes a second non-volatile memory section. Classification information associated with the assembly and stored in the first non-volatile memory section is read out and transmitted to the control unit. The transmitted classification information is stored in the second non-volatile memory section. Subsequently, the classification information stored in the second, non-volatile memory section is read out and transmitted to the additional control unit. The disclosure furthermore relates to an assembly group that comprises the assembly and the control unit, with the control unit and the additional control unit of the assembly being connected to one another by a data transmission path.

28 Claims, 2 Drawing Sheets

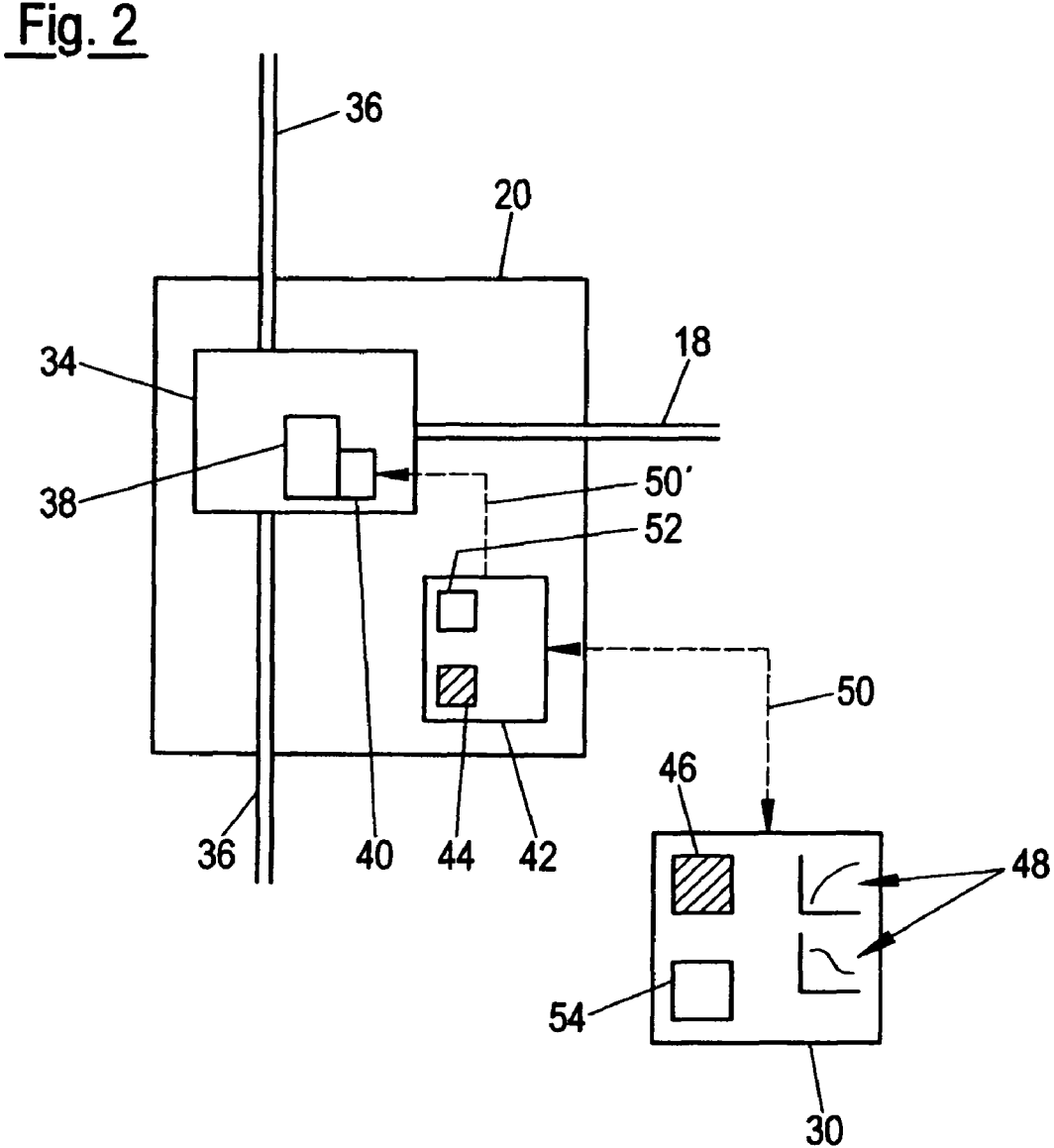

METHOD FOR THE CONTROL OF AN ASSEMBLY

CROSS-REFERENCE TO RELATED APPLICATIONS

Figure 1:
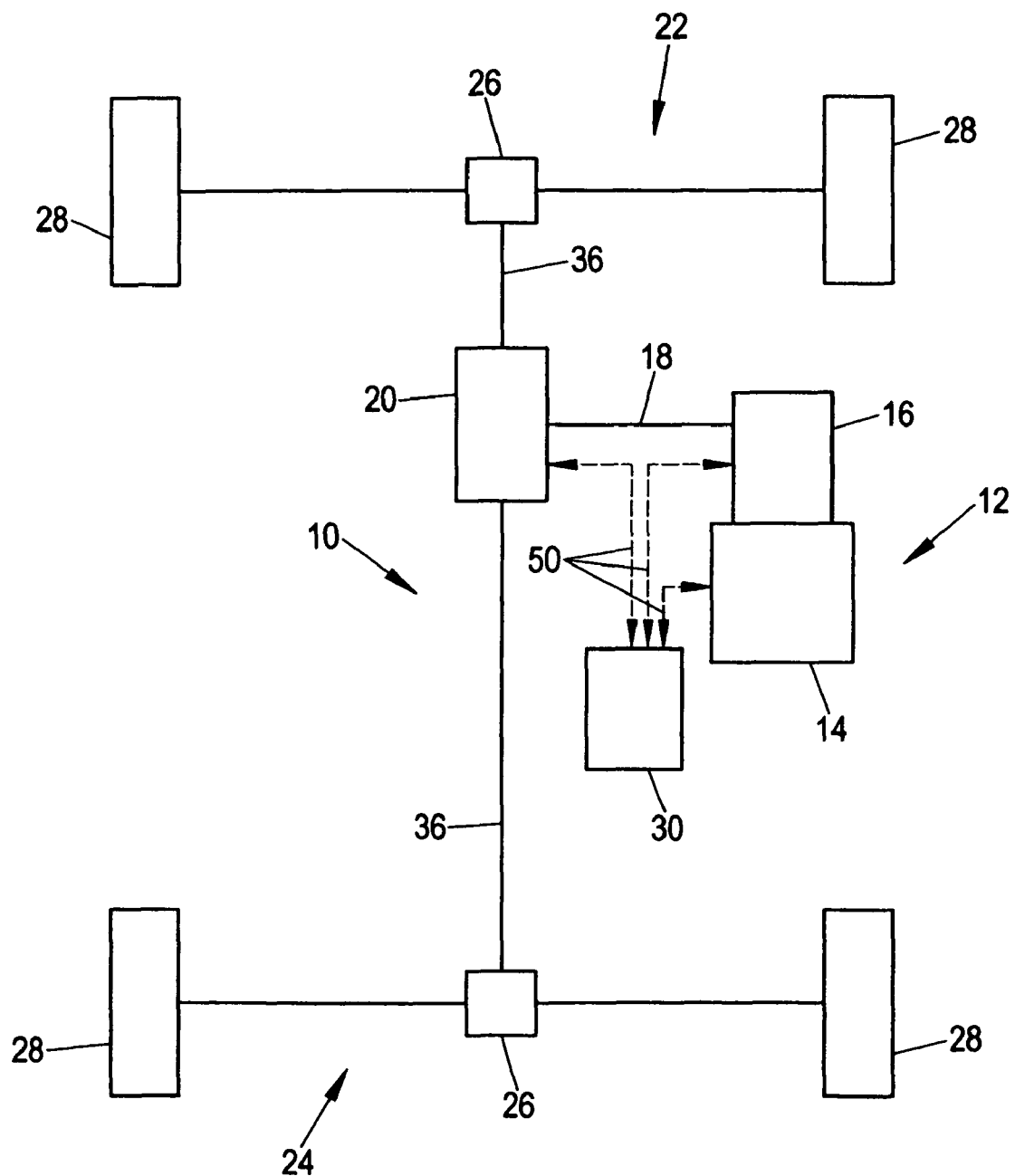

This application claims the benefit and priority of German Patent Application No. 10 2007 062 675.6, filed Dec. 24, 2007. The entire disclosure of the above application is incorporated herein by reference.

FIELD

The present disclosure relates to a method for the control of an assembly by a control unit, in particular in a motor vehicle. The assembly includes at least one component, at least one actuator associated with the component, and an additional control unit having a first non-volatile memory section that is connected to the control unit, with the control unit including a second non-volatile memory section.

BACKGROUND

This section provides background information related to the present disclosure which is not necessarily prior art.

An assembly of this kind may be a transfer case, for example, that allows a direct distribution of a driving torque between two wheels of an axle of the motor vehicle and/or—with an all-wheel drive vehicle—a direct distribution of the driving torque between a front axle and a rear axle of the motor vehicle.

Such assemblies have to be controlled with high accuracy to be able to carry out the distribution of the driving torque with the required precision. However, hardly avoidable tolerances occur in their manufacture that result in deviations in the response behavior of the assemblies. These deviations are determined individually for the purpose of a calibration, with a respective tolerance class being associated with the assemblies in accordance with a predetermined classification scheme. The respectively determined tolerance class of a specific assembly may be taken into account by the associated control unit of the vehicle to control the assembly with the desired precision.

There is a problem in connection with a classification of controllable assemblies—whether in automotive engineering or in other fields—in that the respective assembly and the control unit associated therewith are sometimes installed independently of one another. A teach-in process therefore usually takes place after the installation of the assembly and the control unit in which the respective then current classification of the assembly used is communicated to the control unit and is stored in it. If a replacement or repair of the assembly and/or of the control unit takes place later, for example in case of service, the teach-in process has to be carried out again so that the correct control of the assembly by the control unit is in turn ensured.

It has already been proposed to encode the classification of an assembly with the help of an additional coding plug. DE 103 33 651 A1, for example, describes a coding plug that can be connected directly or indirectly to a control unit and which has a fixed electric circuit. A defined electrical state may be generated by the fixed circuit in the control unit and the state is detected and compared with stored data. The electrical state is then associated with a tolerance class of the assembly that may in turn be used for the adaptation of maps/characteristics for the control of the assembly.

It is, however, disadvantageous with this solution that an additional failure risk of the controllable assembly arises due to the coding plug made as an additional component. Furthermore, the reading out, decoding and comparing of the classification information stored in the circuit of the coding plug may only be realized in a relatively complex and/or expensive manner. In addition, the coding plug likewise has to be replaced on a change of the tolerance class of the assembly. Ultimately, it thus cannot be precluded that a coding plug is connected to the controllable assembly that contains an incorrect classification so that the classification read out of the coding plug by the control unit does not reflect the correct tolerance class of the assembly. The control of the assembly is thereby even made worse under certain circumstances—in comparison with a control solution without any consideration of the tolerance class.

SUMMARY

This section provides a general summary of the disclosure, and is not a comprehensive disclosure of its full scope or all of its features.

It is an object of the present disclosure to provide a method for the control of an assembly that ensures in a simple and reliable manner that the assembly is controlled by the control unit while taking account of the respective then current classification information.

It is furthermore an object of the present disclosure to provide an assembly group that includes a controllable assembly and a control unit that may be operated in a corresponding manner reliably and while taking account of the respective then current classification information.

As already initially mentioned, the present disclosure relates to a method for the control of an assembly by a control unit, wherein the assembly includes at least one component, at least one actuator associated with the component, and an additional control unit having a first non-volatile memory section and which is connected to the control unit, with the control unit including a second non-volatile memory section.

In accordance with the disclosure, classification information associated with the assembly and stored in the first non-volatile memory section is read out and transmitted to the control unit. The transmitted classification information is stored in the second non-volatile memory section. Subsequently, the classification information stored in the second non-volatile memory section is read out and transmitted to the additional control unit.

In other words, a bidirectional exchange of classification information takes place between the additional control unit and the control unit, with it not being significant which of the two units actively initiates or carries out the transmission of the classification information. It is, for example, possible that a respective one of the control units is responsible for one of the transmission directions or that one of the control units controls both transmission directions.

It is, however, important that the classification information stored in the first non-volatile memory section is stored after the reading out and the transmission to the control unit in the second non-volatile memory section there. This classification information is read out again and is transmitted back to the additional control unit. Generally, the method may also start with the reading out of the memory content of the second non-volatile memory section and with the transmission of the classification information to the additional control unit.

The data exchange between the control unit and the additional control unit ensures that classification information associated with the actually installed assembly is always exchanged. For example, on a change of the classification information stored in the first non-volatile memory section, the classification information is transmitted to the control unit by the method in accordance with the disclosure and is stored there in its second non-volatile memory section. The classification information transmitted back to the additional control unit may be used, for example, for comparison purposes, test purposes, or other purposes. After the transmission of the classification information in the control unit, the new classification is in every case present there and may be used, for example, for optimization of the assembly control.

The classification information transmitted to the additional control unit is preferably stored in the first non-volatile memory section if the first non-volatile memory section does not contain any classification information. This may be the case, for example, if the additional control unit was replaced or if the memory content of the first non-volatile memory section was deleted. The additional control unit then receives the classification information stored in the second non-volatile memory section of the control unit, whereby the data loop is again completed.

In a further embodiment of the present disclosure, the classification information transmitted to the additional control unit is not stored in the first non-volatile memory section if the first non-volatile memory section already contains classification information. This, for example, prevents the overwriting of previously stored and assembly-specific classification information. The non-stored classification information may be ignored or may be further processed for comparison purposes.

In a preferred embodiment of the present invention, the classification information is used by the control unit for the adaptation of at least one map or of at least one characteristic to improve the control of the assembly. The relationship stored in the control unit between a control signal and the thereby generated response of the assembly may, for example, be modified in dependence on the classification information to obtain a corrected relationship that allows a more precise control of the assembly.

Provision may furthermore be made that the classification information is composed of at least two pieces of partial information, with one of the pieces of partial information being associated with the component as a component classification and the other piece of partial information being associated with the actuator as an actuator classification. This allows an even more individual taking into account of the individual components of the assembly on its control. Changes in the tolerance class of the component and/or of the actuator—for instance, on a repair or a replacement of the component and/or of the actuator—may thereby, for example, be taken into account separately from one another. Further components of the assembly may likewise be taken into account by corresponding pieces of partial information. Generally, pieces of partial information may also be provided that do not contain any tolerance class information, such as serial numbers or the like.

In accordance with a further embodiment of the method in accordance with the disclosure, the pieces of partial information of the classification information stored in the second non-volatile memory section are overwritten by the corresponding pieces of partial information transmitted to the control unit, whereby it is prevented that different pieces of information that may differ from one another are collected in the second non-volatile memory section. The then currently valid pieces of partial information are therefore always present in the control unit due to the overwriting. It must be noted in this connection that in each case only the corresponding pieces of partial information are overwritten by new pieces of partial information, (i.e., a stored value of the then current component classification should, for example, not be overwritten by a value of the actuator classification, but rather the component classification value stored in the second non-volatile memory section should be overwritten by the component classification value transmitted by the additional control unit). A comparison of the stored component classification value with the transmitted component classification value before the storing is not necessary in this respect. A check only has to be made whether the transmitted component classification value is "empty" or is flagged as "empty", for example by the value "0". If the transmitted classification information contains, for example, only a first piece of partial information (i.e., a second piece of partial information is "empty" or is flagged as an "empty" piece of partial information) only the transmitted first piece of partial information is used for the overwriting of the first piece of partial information stored in the second non-volatile memory section. A second piece of partial information stored there is not overwritten or changed.

It is preferred that the actuator and the additional control unit associated with it are replaced by a replacement actuator and by a replacement additional control unit associated with it in case of service, with its first non-volatile memory section only including the actuator classification. In other words, the first non-volatile memory sections does not contain any component classification if the component was not replaced in the course of the servicing. In accordance with the method in accordance with the disclosure, the valid component classification is still stored in the control unit and, after the replacement of the actuator and of the additional control unit, it is again transmitted to the latter and is stored there to complete the data loop.

It is preferred if, in the case described above, the actuator classification includes information characterizing a typical actuator or information individually determined for the replacement actuator. The first variant is particularly cost-effective since it only provides for the storage of an actuator classification of a typical or "average" actuator. Costs are saved due to the waiving of an individual characterization of the replacement actuator and the storage of the corresponding actuator classification, while an at least "averagely" good control of the actuator still remains possible. The second variant in contrast allows a more precise control of the assembly; however, it is associated with an increased effort and/or cost.

It is generally possible that, on a replacement of the component and/or of the actuator without a replacement of the additional control unit, the component classification and/or the actuator classification are each replaced by information that characterizes a typical component or a typical actuator or that was determined individually for the component or for the replacement actuator. The procedure of the first variant includes, for example, a resetting of the additional control unit to default values of the component classification and of the actuator classification since the obsolete classifications associated with the previously used components could result in worse control results in interaction with the new components. The second variant in contrast allows a more precise control of the assembly; however, it is associated with an increased effort and/or cost.

In accordance with a further embodiment of the method in accordance with the disclosure, the pieces of partial information transmitted to the additional control unit are not stored in the first non-volatile memory section if the first non-volatile memory section already contains values for the corresponding piece of partial information. In other words, a check is made whether the parts of the first non-volatile memory section associated with the individual pieces of partial information are "empty" or are flagged as "empty"—for example by the value "0"—before a storage of the corresponding piece of partial information takes place. It should be prevented in this way that information stored in the additional control unit is overwritten. Provision may furthermore be made that the pieces of partial information transmitted to the additional control unit is stored in the first non-volatile memory section if the first non-volatile memory section does not contain any values for the corresponding pieces of partial information. In this variant of the method, in particular the total classification information is stored if only the additional control device was replaced and does not have an empty first non-volatile memory section, or a first non-volatile memory section flagged as "empty", but the actuator and the component were not replaced. In this case, the memory content of the first non-volatile memory section is updated again by the data transmitted by the control unit.

It has proved to be advantageous if the classification information associated with the assembly and/or the pieces of partial information associated with the individual components of the assembly is/are determined ex works (i.e., where the individual components are manufactured) and is/are stored in the first non-volatile memory section.

The transmission of the classification information to the control unit can take place at predetermined times or after reception of a request signal. This can, for example, be done regularly or after an initialization at the start of an ignition procedure of the vehicle. Furthermore, the transmission of the classification information to the additional control unit may also take place at predetermined times or after reception of a request signal, in particular after reception of data from the additional control unit or at regular intervals.

The classification information preferably includes information on the tolerance class of the component and/or of the actuator, in particular to adapt at least one map/one characteristic to control the assembly.

A more complex and/or expensive embodiment, but one that allows a particularly precise control of the assembly, provides that the classification information includes a map/a characteristic of the assembly, of the component and/or of the actuator. For example, a torque characteristic is transmitted which covers the total torque range of a torque transmission clutch.

As already initially mentioned, the present disclosure also relates to an assembly group that has a controllable assembly and a control unit, in particular for a motor vehicle, with the controllable assembly including at least one component, at least one actuator associated with the component and an additional control unit having a first non-volatile memory section, with the control unit including a second non-volatile memory section and with the control unit and the additional control unit being connected to one another by a data transmission path.

In accordance with the disclosure, the first non-volatile memory section is made for the storage of classification information associated with the assembly, whereas the data transmission path is designed such that the classification information may be transmitted from the additional control unit to the control unit and vice versa. The control unit is made for the transmission of the classification information to the additional control unit. A two-way transmission of the classification information between the additional control unit and the control unit is thereby made possible in order, for instance, also always to have current classification information present after a case of servicing.

The additional control unit preferably includes a test unit that is made to check the memory content of the first non-volatile memory section and to store the classification information, or parts thereof, transmitted to the additional control unit in the first non-volatile memory section if no classification information or if incomplete classification information is stored in the first non-volatile memory section—for instance, classification information not including all pieces of partial information. In other words, it is determined by the test unit whether the memory content of the first non-volatile memory section is "empty" or is flagged as "empty"—in part or in total. In this respect, it is not the stored value of the information which is important, but rather whether this information is present at all, with it having to be pointed out in this connection that specific values—such as "0"—can only serve as a flag to indicate that the corresponding information is not present. If no partial information or no corresponding pieces of partial information is/are present, this is stored in the first non-volatile memory section. The test unit thus ensures that always current information is stored in the additional control unit.

In addition, the control unit may include a memory unit which is made to overwrite the classification information, or parts thereof, stored in the second non-volatile memory section by the classification information, or corresponding parts thereof, transmitted by the additional control unit. The information present in the control unit is updated by the overwriting. This procedure moreover saves memory space.

In accordance with an embodiment of the assembly group in accordance with the information, some of the pieces of classification information may be transmitted over the data transmission path and/or may be stored in and/or read out of the first and second non-volatile memory sections independently of one another.

The component is preferably a torque transmission clutch. The assembly may be a transfer case.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic representation of a part of a motor vehicle with a controllable assembly made in accordance with the disclosure; and FIG. 2 is a schematic design of a controllable assembly made in accordance with the disclosure with a control unit connected thereto.

Corresponding reference numerals indicate corresponding parts throughout the several views of the drawings.

DETAILED DESCRIPTION

Example embodiments will now be described more fully with reference to the accompanying drawings.

A powertrain 10 of a motor vehicle having a drive 12 is shown schematically in FIG. 1. The drive 12 includes an engine 14 and a transmission 16 that is connected to a transfer case 20 via a drive shaft 18. The transfer case 20 serves to distribute the driving torque of the engine 14 as required via output shafts 36 to a front axle 22 and/or to a rear axle 24 of the vehicle. Depending on the driving situation, the driving torque may, for example, only be transferred by the transfer case 20 to one of the axles 22, 24 or to both axles 22, 24 in variable proportions. The axles 22, 24 each include a differential unit 26 that is provided for the compensation of speed differences between wheels 28.

To be able to influence the different driving situations of the vehicle, the vehicle has a control unit 30 that receives information on the state and on the movements of the vehicle and its environment via a plurality of sensors (not shown). This data is logged and evaluated by the control unit 30. The evaluation of the data allows the generation of control signals that are in turn transmitted to the components of the vehicle to control the vehicle in the desired manner. For example, control lines 50 are shown in FIG. 1 which connect the control unit 30 to the engine 14, to the transmission 16, and to the transfer case 20. A data bus, in particular a CAN bus, may also be provided instead of separate control lines 50. The control signals are in particular present in a digital format.

FIG. 2 is a very simplified schematic representation of the transfer case 20 and of the control unit 30 connected thereto.

The transfer case 20 includes a transfer case unit 34 that allows a torque of the drive shaft 18 to be distributed selectively to the output shafts 36 that are connected to the respective differential unit 26 of the front axle 22 or of the rear axle 24, respectively (see FIG. 1). The selective distribution of the torque of the drive shaft 18 depends on the state of a friction clutch 38 of the transfer case unit 34. For example, the driving torque is only transmitted to the rear axle 24 with an open friction clutch 38. To transmit some of the driving torque to the front axle 22 as well, the friction clutch 38 is brought into engagement at least partially. In other words, the portion of the driving torque transmitted to the front axle 22 is a function of the degree of actuation of the friction clutch 38. The precise actuation of the clutch 38 is thus of great significance to allow a precisely defined distribution of the driving torque to the axles 22, 24.

It must be taken into account in this connection that each friction clutch 38 has production-induced properties. This likewise applies to a clutch actuator 40 that can selectively bring the friction clutch 38 into engagement (i.e., the friction clutch 38 and the clutch actuator 40 respond to a given control signal in a characteristic manner which differs from other friction clutches 38 or clutch actuators 40 basically of the same construction). These practically unavoidable differences originate, for example, in manufacture-induced production tolerances and/or in slight variations of the properties of the material used.

To ensure the desired distribution of the driving torque with the required precision, it is necessary to take the characteristics of each transfer case 20 into account individually and to adapt the control signals supplied to it accordingly.

This is effected in that the individual components of the transfer case 20 are measured individually or in total at the end of production (i.e., the response of the components or of the total transfer case 20 to specific control signals is observed and a special characteristic is determined). This is in particular characterized by the torque transmission characteristics of the friction clutch 38 and the behavior of the clutch actuator 40. The specific characteristics are associated with one of a plurality of tolerance classes. The control signals for the transfer case 20 may be adapted with reference to the specific tolerance class—for instance by adaptation of maps/characteristics—to achieve a distribution of the driving torque which is as exact as possible.

The control signals of the control unit 30 are supplied to the clutch actuator 40 via an additional control unit 42 and via a control line 50'. The additional control unit 42 has an additional control unit memory 44 in which the tolerance class described above is stored. The control signals transmitted by the control unit 30 may be adapted in the additional control unit 42 while taking the tolerance class into account to be able to provide adapted control signals to the clutch actuator 40. It is expedient, however, to make the additional control unit 42 as simple as possible and to carry out the correction of the control signals in the control unit 30. For this purpose, the control unit 30 must be supplied with the corresponding tolerance class information. This is done by the additional control unit 42 reading out the tolerance class information from the additional control unit memory 44 and transmitting it to the control unit 30. This information may be stored in a control unit memory 46 by a control unit 54.

The information stored in the control unit memory 46 is used for the adaptation of characteristics 48 that are used for the generation of control signals for the transfer case 20. The tolerance class information stored in the control unit memory 46 is subsequently again transmitted to the additional control unit 42 via the control line 50, whereupon the memory content of the additional control unit memory 44 is checked by a test section 52. If the additional control unit memory 44 already has a stored value, the value transmitted by the control unit 30 is ignored. If the additional control unit memory 44 is, however, empty or is flagged as "empty", the transmitted information is written into the additional control unit memory 44. The process subsequently starts again with the reading out and the transmission of the information stored in the additional control unit memory 44 to the control unit 30. An exchange of information between the additional control unit 42 and the control unit 30 thus takes place at predetermined times, at regular intervals or in response to request signals. The exchange of data is in particular of importance after an initialization at the start of an ignition procedure of the vehicle.

If a tolerance class determined ex works (i.e., where the individual components are manufactured) was stored in the additional control unit memory 44, the correct value is stored in the control unit memory 46 of the control unit 30 after a first transmission of this information. The value of the tolerance class transmitted back to the additional control unit 42, therefore, agrees with the originally stored value. As described above, this tolerance class information is ignored since the additional control unit memory 44 already contains corresponding information.

If, however, the additional control unit 42 was removed and replaced by a new additional control unit 42, the additional control unit memory 44 is empty or is flagged as "empty". On a take-up of communication between the new additional control unit 42 and the control unit 30, no information is transmitted from the additional control unit 42 to the control unit 30. However, the correct tolerance class information of the friction clutch 38 and of the clutch actuator 40 is still contained in the control unit memory 46. This information is transmitted in the course of the data loop described above to the additional control unit 42 where the test section 52 determines that the additional control unit memory 44 is empty. The value of the tolerance class information is thereupon stored in the additional control unit memory 44 and is thus again available to the data loop.

One of the advantages of the invention thus consists of the fact that, if the control unit 30 is replaced or is reset for another reason and the information in the control unit memory 46 is lost, the tolerance class information is still present in the additional control unit 42 and it can be utilized. In the converse case, the tolerance class information can be utilized in the control unit 30. The concept in accordance with the disclosure with the storage of the tolerance class information both in the additional control unit 42 and in the control unit 30 is thus based on the principle of redundancy in order to always allow a precise control of the transfer case 20.

The additional control unit 42 and the clutch actuator 40 frequently form one module and are replaced together in case of service. In this case, it is advantageous if the tolerance class information is composed of information with respect to the friction clutch 38 and information with respect to the clutch actuator 40. A newly inserted module only comprises a piece of partial information with respect to the clutch actuator 40 in the case of replacement, whereas the part of the additional control unit memory 44 provided for the tolerance class information of the friction clutch 38 is empty or is flagged as "empty". On a repeat initialization after the replacement of the module, only the tolerance class information of the clutch actuator 40 is overwritten in the control unit memory 46. The tolerance class information of the friction clutch 38 is maintained and is transmitted to the additional control unit 42 where the test section 52 finds that no tolerance class information of the friction clutch 38 is present in the additional control unit memory 44. This information is then written to the additional control unit memory 44, whereby complete tolerance class information is again present there.

If the module of clutch actuator 40 and additional control unit 42 is replaced, a replacement module is frequently used that may not be equipped with an individually determined tolerance class value of the clutch actuator 40 since an individual determination of the tolerance class for each spare part is too costly. In this case, a tolerance class value of the clutch actuator 40 is stored in the additional control unit memory 44 that characterizes a typical or "average" clutch actuator 40.

It is easy to see that the tolerance class information may include more than two pieces of partial information if a plurality of components cooperate to produce an adjustment movement or an actuation.

With particularly demanding applications, however, the additional effort and/or cost described above may be justified. Provision may also be made that it is not tolerance class information that is exchanged between the units 30 and 42, but rather the characteristics of the respective components themselves.

The disclosure has been described by way of example with reference to a transfer case 20 of a motor vehicle that is characterized by tolerance class information; however, the principles of the disclosure may also be used in other systems of a motor vehicle. A series of applications also result outside automotive engineering in which the taking into account of individual features and characteristics of specific assemblies—or individual components thereof—is important.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for the control of an assembly by a control unit, in particular in a motor vehicle, wherein the assembly includes at least one component, at least one actuator associated with the component and an additional control unit having a first non-volatile memory section which is connected to the control unit, with the control unit including a second non-volatile memory section, comprising:
   reading out and transmitting classification information associated with the assembly and stored in the first non-volatile memory section to the control unit, the control unit being distinct and spatially separated from the assembly;
   storing the transmitted classification information in the second non-volatile memory section of the control unit; and
   reading out and transmitting the classification information stored in the second non-volatile memory section to the additional control unit, wherein the classification information transmitted to the additional control unit is stored in the first non-volatile memory section if the first non-volatile memory section does not contain any classification information and the classification information transmitted to the additional control unit is not stored in the first non-volatile memory section if the first non-volatile memory section already contains classification information.

2. The method in accordance with claim 1, wherein the classification information is used by the control unit for the adaptation of at least one control characteristic to improve the control of the assembly.

3. The method in accordance with claim 1, wherein the classification information is composed of at least two pieces of partial information, with one of the pieces of partial information being associated with the component as a component classification and the other piece of partial information being associated with the actuator as an actuator classification.

4. The method in accordance with claim 3, wherein the pieces of partial information of the classification information stored in the second non-volatile memory section are overwritten by the corresponding pieces of partial information transmitted to the control unit.

5. The method in accordance with claim 3 further comprising the step of replacing the actuator and the additional control unit associated with the actuator in case of service by a replacement actuator and a replacement additional control unit associated with the replacement actuator whose first non-volatile memory section only includes the actuator classification.

6. The method in accordance with claim 5, wherein the actuator classification includes information characterizing a typical actuator or information determined individually for the replacement actuator.

7. The method in accordance with claim 3, wherein replacement of at least one of the component and the actuator without replacement of the additional control unit causes the respective one of the component classification and the actuator classification to be replaced by information that characterizes a typical component or a typical actuator, respectively, or that was determined individually for the component or the replacement actuator respectively.

8. The method in accordance with claim 3, wherein the pieces of partial information transmitted to the additional control unit are not stored in the first non-volatile memory section if the first non-volatile memory section already contains values for the corresponding pieces of partial information.

9. The method in accordance with claim 3, wherein the pieces of partial information transmitted to the additional control unit are stored in the first non-volatile memory section if the first non-volatile memory section does not contain any values for the corresponding pieces of partial information.

10. The method in accordance with claim 1, wherein the classification information associated with the assembly is determined where the individual components are manufactured and is stored in the first non-volatile memory section.

11. The method in accordance with claim 1, wherein the transmission of the classification information to the control unit takes place at predetermined times or after reception of a request signal.

12. The method in accordance with claim 1, wherein the transmission of the classification information to the additional control unit takes place at predetermined times or after reception of a request signal.

13. The method in accordance with claim 1, wherein the classification information includes information on the tolerance class of at least one of the components and the actuator.

14. The method in accordance with claim 1, wherein the classification information includes a characteristic of at least one of the assembly, the component and the actuator.

15. The method in accordance with claim 1, wherein the transmission of the classification information takes place digitally.

16. An assembly group having a controllable assembly and a control unit, in particular for a motor vehicle, the controllable assembly comprising:
at least one component;
at least one actuator associated with the component; and
an additional control unit having a first non-volatile memory section, with the control unit including a second non-volatile memory section such that the control unit and the additional control unit are spatially separated and connected to one another by a data transmission path,
wherein the first non-volatile memory section stores classification information associated with the controllable assembly;
the data transmission path is made such that the classification information is transmitted from the additional control unit to the control unit; and
the control unit transmits the classification information to the additional control unit,
wherein the additional control unit includes a test unit that checks the memory content of the first non-volatile memory section and stores the classification information, or parts thereof, transmitted to the additional control unit in the first non-volatile memory section only if no classification information is stored in the first non-volatile memory section.

17. The assembly group in accordance with claim 16, wherein the control unit includes a memory unit that overwrites the classification information, or parts thereof, stored in the second non-volatile memory section with the classification information, or parts thereof, transmitted by the additional control unit.

18. The assembly group in accordance with claim 16, wherein some of the pieces of classification information are transmitted independently of one another via the data transmission path or are stored or read out in the first and second non-volatile memory sections.

19. The assembly group in accordance with claim 16, wherein the component is a torque transmission clutch.

20. The assembly group in accordance with claim 16, wherein the controllable assembly is a transfer case.

21. The assembly group in accordance with claim 16, wherein the data transmission path includes a CAN bus between the control unit and the additional control unit.

22. A method for controlling the transfer of drive torque in a motor vehicle from a drive unit to an axle assembly, comprising:
providing a torque transfer unit having a first rotary member driven by the drive unit, a second rotary member driving the axle assembly, a friction clutch disposed between the first and second rotary members, an actuator for controlling engagement of the friction clutch, and an actuator control unit operable to control actuation of the actuator in response to a control signal;
providing a vehicle control unit operable to receive information on the operating state of the vehicle and provide the control signal to the actuator control unit, wherein the actuator control unit is spatially separated from the vehicle control unit;
storing classification information associated with at least one of the friction clutch and the actuator in a first memory section of the actuator control unit;
transmitting the classification information from the first memory section for storage in a second memory section of the vehicle control unit; and
transmitting the classification information stored in the second memory section to the actuator control unit, wherein the classification information transmitted to the actuator control unit is stored in the first memory section only if the first memory section does not contain any classification information and the classification information transmitted to the actuator control unit is not stored in the first memory section if the first memory section already contains classification information.

23. The method of claim 22 wherein the vehicle control unit includes characteristics used for generation of the control signal that is sent to the actuator control unit, and wherein the classification information transmitted from the first memory section is used for adaption of the characteristics.

24. The method of claim 22 wherein the classification information is composed of a first piece of partial information associated with the friction clutch as a clutch classification and a second piece of partial information associated with the actuator as an actuator classification.

25. The method of claim 24 wherein the first and second pieces of partial information transmitted to the actuator control unit are not stored in the first memory section if the first memory section already contains values for the corresponding first and second pieces of partial information, and wherein the first and second pieces of partial information transmitted to the actuator control unit are stored in the first memory section if the first memory section does not contain values for corresponding first and second pieces of partial information.

26. A power transfer system for a motor vehicle comprising:
a first rotary member supplied with drive torque from a drive unit;
a second rotary member coupled to an axle assembly;
a friction clutch operably disposed between the first and second rotary members;
a clutch actuator operable for controlling frictional engagement of the friction clutch;
an actuator control unit operable to control actuation of the clutch actuator in response to a control signal;

a vehicle control unit operable to receive information on the operating state of the vehicle and provide the control signal to the actuator control unit; and a data transmission path between a first memory section of the actuator control unit and a second memory section of the vehicle control unit, and wherein classification information associated with at least one of the friction clutch and the clutch actuator stored in the first memory section is read out and transmitted to the vehicle control unit for storage in the second memory section and is thereafter read out and transmitted to the actuator control unit, wherein the actuator control unit is configured to receive the classification information from the vehicle control unit and operates to store the classification information in the first memory section only if the first memory section does not contain any classification information.

27. The power transfer system of claim 26 wherein the classification information transmitted to the actuator control unit is not stored in the first memory section if the first memory section already contains classification information.

28. The power transfer system of claim 26 wherein the vehicle control unit includes characteristics used for generation of the control signal sent to the actuator control unit, and wherein the classification information transmitted from the first memory section is used for adaption of the characteristics.

* * * * *